UNITED STATES PATENT OFFICE.

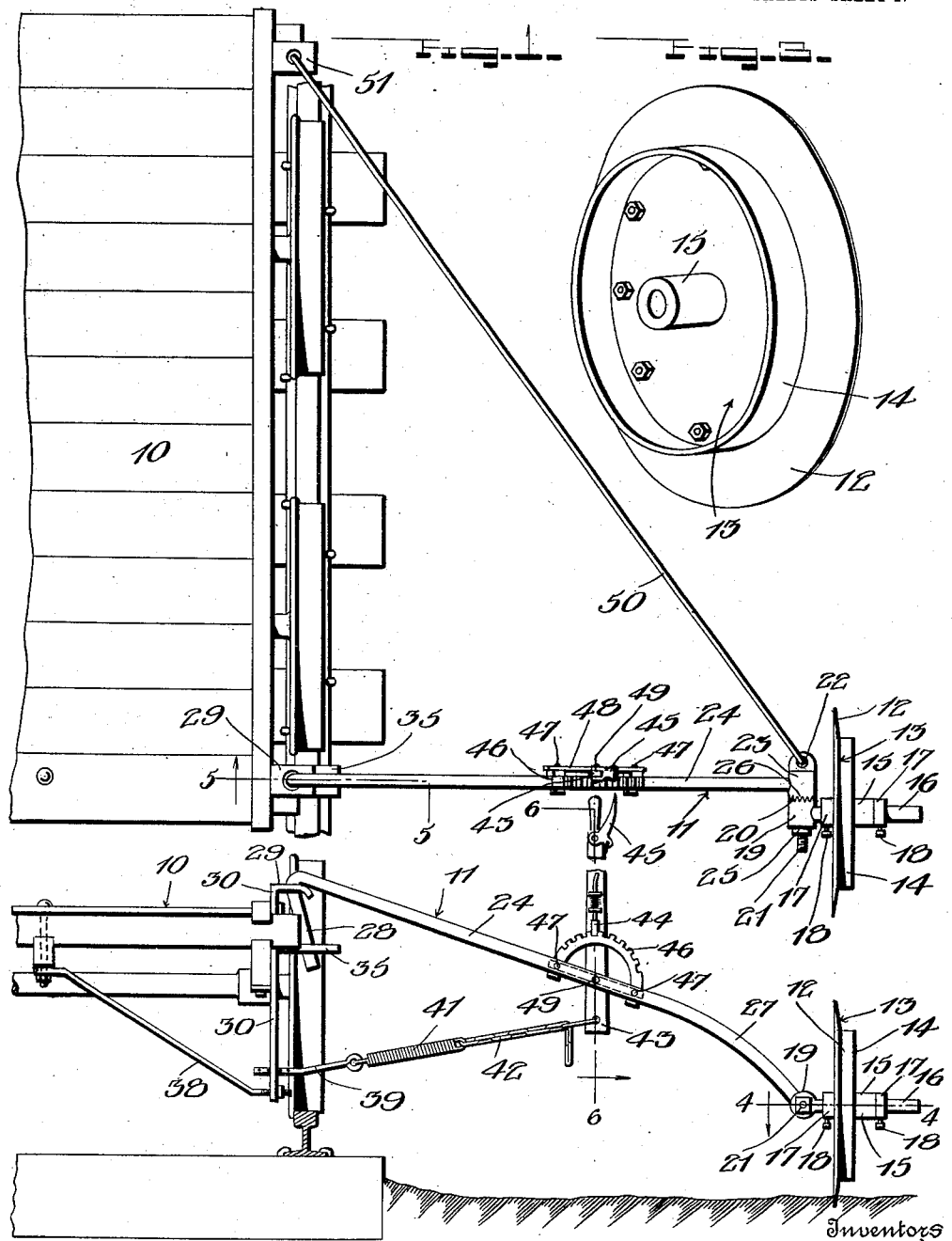

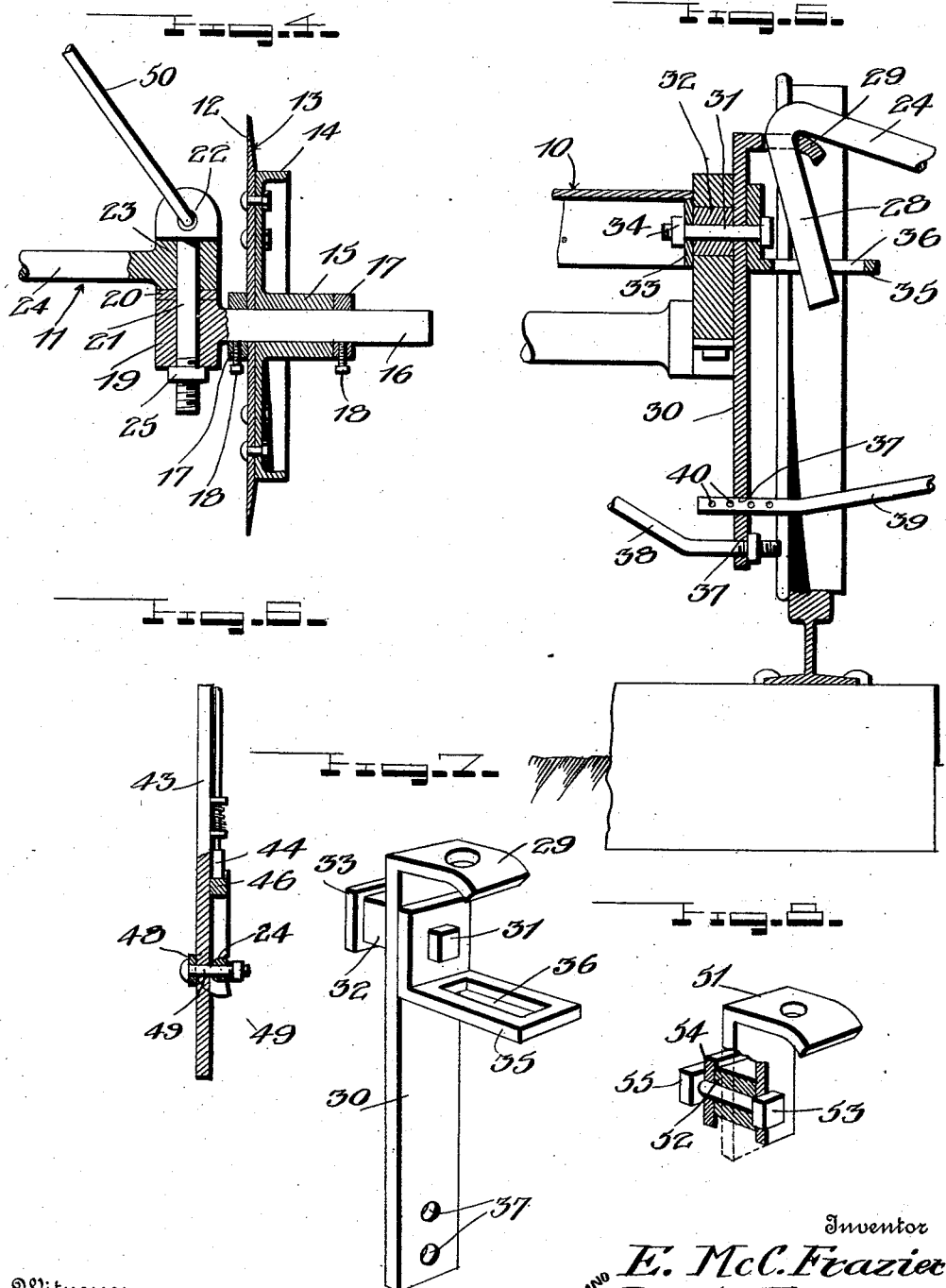

EMMA McCARTNEY FRAZIER AND JOHN S. FRAZIER, OF ALLEN COUNTY, INDIANA.

LAND-MARKER.

1,068,884.

Specification of Letters Patent.

Patented July 29, 1913.

Application filed June 29, 1912. Serial No. 706,692.

*To all whom it may concern:*

Be it known that we, EMMA MCCARTNEY FRAZIER and JOHN S. FRAZIER, citizens of the United States, residing in Allen county, State of Indiana, have invented certain new and useful Improvements in Land-Markers; and we do hereby declare the following to be a full, clear, and exact description of the invention, such as will enable others skilled in the art to which it appertains to make and use the same.

This invention relates to sod line cutters and more particularly to sod line cutters for hand cars and the like.

An object of the invention is to provide a sod line cutter which may be readily attached to a hand car and adjustably supported thereby for cutting or marking the sod a predetermined distance from the side of the track.

Another object is to provide an attachment of this character which may be adjustably and resiliently secured to the side of a hand car or the like to mark and cut the sod along the side of the track in order that the sod may be readily removed by spades or other suitable implements.

A further object is to provide a device of this character, the parts of which are adjustably connected and are of such form and construction that the device may be readily secured in position upon the truck of a hand car, an agricultural implement or in fact the truck of any wheeled device to automatically mark and cut the sod as the wheeled device to which it is secured is moved along the ground, the sod cutting device being provided with shock absorbing mechanism to absorb all shocks incident to the cutting disk coming in contact with stones or other obstructions.

With these and other objects the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a top plan view showing the application of our invention. Fig. 2 is a rear view thereof. Fig. 3 is a perspective view of our marker detached. Fig. 4 is a horizontal sectional view on the line 4—4 of Fig. 2. Fig. 5 is a vertical sectional view on line 5—5 of Fig. 1. Fig. 6 is a vertical sectional view on the line 6—6 of Fig. 2. Fig. 7 is a detail perspective view of the brackets etc. for connecting the inner end of the rear rod to the truck. Fig. 8 is a similar view of the brackets etc. for connecting the inner end of the front rod to the truck.

Referring now to the drawings in which like characters of reference designate similar parts, 10 designates in general the truck of a hand car to which our marker is secured, the hand car being shown positioned upon a track and the marker projecting from one side of the truck, said marker being designated in general by the numeral 11.

The marker 11 comprises a marking disk 12 secured to one face of the wheel 13 and projecting for some distance beyond the periphery of the wheel 13. The wheel 13 has the circumferential flange 14 directed at a right angle from the side opposite that to which the disk 12 is secured. The hub 15 of the wheel is slidably engaged over the spindle 16 and held in adjusted position upon said spindle by means of the collars 17 upon opposite sides of the wheels which collars in turn are held in proper position upon the spindle 16 by means of their set screws 18. It will be understood that the disk 12 is provided with a suitable central opening registering with the opening in the hub 15.

The rear end of the spindle 16 is formed into a head 19 having a suitable longitudinal bore therethrough and the teeth 20 upon one end and arranged in a circle around the central longitudinal bore of the head.

The pivot pin 21 is provided with the eye 22 at one end and is passed through the central bore in the head 19 and also through the corresponding central longitudinal bore in the head 23 at the forward end of the main supporting rod 24, said pin being first passed through the head 23 and finally through the head 19, after which the nut 25 or other suitable fastening means is adjusted upon its free end.

The head 23 is provided with teeth 26 adapted for registration with the teeth 20 and the head 19 to lock said heads against independent rotation. The main supporting rod 24 is preferably curved upwardly for a short distance from the head 23, as shown at 27, to avoid the end of the tie and then extended in a straight direction, with the opposite end 28 bent downwardly and slightly toward the head 23, as will be clearly seen by referring to the drawings. The bent end 28 of the rod 24 is passed through the horizontal upper end 29 of the bracket plate 30 which is removably secured to one side of the truck 10, as will be later fully described.

The bracket plate 30 is secured to the side of the truck by means of the bolt 31 passed therethrough and through a spacing block 32 of the truck frame with a plate 33 and nut 34 upon the threaded end of the bolt. One angle of the supporting member 35 is secured against the front or outer face of the bracket plate 30, by means of a bolt 31, previously mentioned while the other angle thereof extends in an outward direction from the plate 30 and is provided with an elongated opening therethrough to receive the extremity of the bent end 28, said opening being designated by the numeral 36.

Adjustably secured through one of the spaced openings 37 in the lower end of the plate 30, is one end of the brace rod 38, the opposite end of which is flattened and apertured for engagement with a bolt carried by the truck 10, the purpose of the rod 38 being to brace the plate 30.

Pivotally connected to the plate 30, near the lower end thereof, is the rod 39, which is pivoted to the plate 30 by means of a bolt or the like passed through one of the series of openings 40 through the end of the rod 39, as will be clearly understood. By providing the series of spaced openings 40, the rod 39 may be adjustably secured to the plate. Connected to the opposite end of the rod 39 is the spring 41 to which is also connected the chain 42 having one end connected to the lower end of the tension lever 43. The lever 43 is pivoted to the straight portion of the main supporting rod 24 and has the pawl 44 carried thereby and controlled by the releasing finger 45 engaged with the rack 46 carried by the straight portion of said rod 24. The rack 46 is secured at its opposite ends to the straight portion of the rod 24 by means of the bolts 47 which are also passed through the bracing strap 48 positioned against the ends of said rack and parallel with the rod 24. The pivot pin 49 of the lever 43 is also passed through the strap 48 and the lever 49 positioned between the rod 24 and the strap 48. The rack 46 has the main portion thereof directly above the rod 24 and is secured in this position by means of the bolts 47, previously mentioned, which extend through the opposite ends of said rack member, which ends are bent around and beneath the rod 24, as will be clearly seen by referring to the drawings. By swinging the lever 43 in the proper direction the tension of the spring 41 may be increased or decreased as desired and the lever may be readily locked in position to retain the spring under the desired tension by allowing the pawl 44 to engage in the proper notch of the rack 46.

A forward brace rod has one end turned and secured through the eye 22 of the bolt 21, said forward rod being designated by the numeral 50 and having its opposite end turned and engaged in the horizontal upper end of the L-shaped bracket 51 which is removably secured to the forward portion of the truck 10, by means of the bolt 53 passed therethrough and through a spacing block 52 of the truck frame, said bolt having the plate 54 and nut 55 upon its threaded end and against said spacing block 52. The rod 50 extends at an angle to the rod 24 and as said rods are removably secured in the bracket plate 30 and L-shaped bracket 51 respectively, the rods and parts carried thereby may be readily removed without detaching the parts 30 and 51 from the truck 10.

It will be evident that the supporting members 30 and 51 may be readily removed from the truck or positioned thereupon when desired. Owing to the coöperating teeth 20 and 26 upon the heads 19 and 23 respectively, the spindle 16 may be secured at any desired angle to the bolt 21 to support the disk 13 on the proper slant for marking the surface and cutting through the sod as the truck 10 moves along the track. Should the disk 13 come in contact with a stone or other obstruction the end 28 will swing in the elongated slot 36 and thus allow the rod 24 to rock in the upper turned or horizontal end 29 of the bracket plate 30. The shock incident to the striking of the object, however, will be effectively absorbed by means of the spring 41.

It will of course be understood that minor changes in the details of construction may be made if desired without in the slightest degree departing from the spirit of our invention.

What is claimed, is:—

1. A device of the class described comprising angularly positioned supporting rods, means for removably securing the spaced ends of the rods to a truck, means for bracing the securing means, an adjustably secured spindle projecting from the adjacent ends of the rods, a marker carried by the spindle, a lever carried by one of the rods, and shock absorbing mechanism connected to the lever and the securing means for the rods.

2. A device of the character described comprising angular supporting rods, means for detachably supporting the rear ends of the rods, one of said rods having an enlarged head with teeth upon one end and provided with a longitudinal bore, a spindle having an enlarged head with a longitudinal bore, said last mentioned head also having teeth on one end and interlocking with the teeth on the first head, a bolt passed through the bores, the other rod connected with the bolt, a marker adjustably secured upon the spindle and means for resiliently holding the marker in engagement with the ground.

In testimony whereof, we affix our signatures in presence of two witnesses.

EMMA McCARTNEY FRAZIER.
JOHN S. FRAZIER.

Witnesses:
BESSE BRIGGS,
ORPHA MADDEN.

Copies of this patent may be obtained for five cents each, by addressing the "Commissioner of Patents. Washington, D. C."